Figure 5:
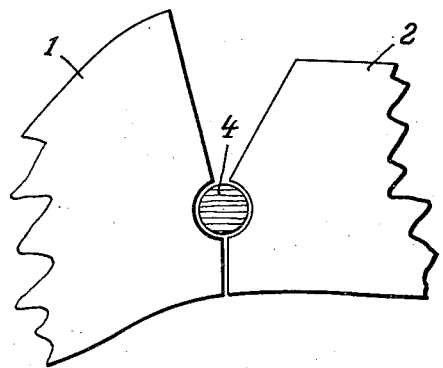

June 8, 1937.  K. BENSCHEIDT, JR  2,083,111
DOWEL FOR LASTS
Filed May 18, 1936  2 Sheets-Sheet 1
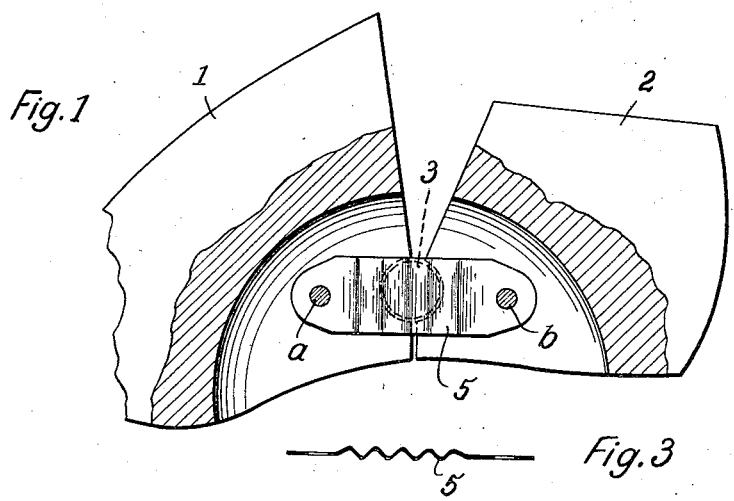
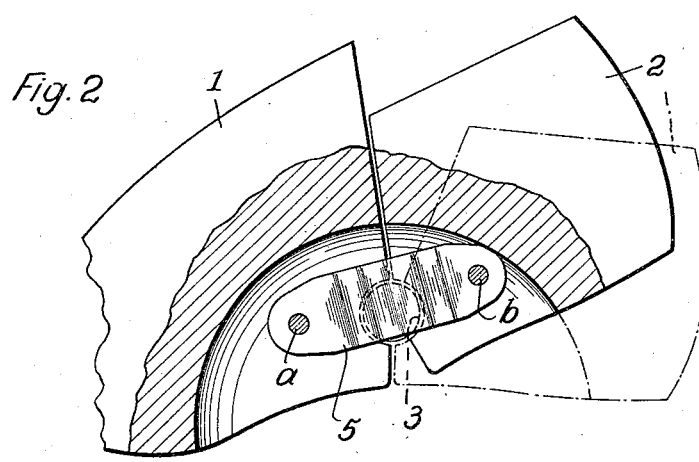
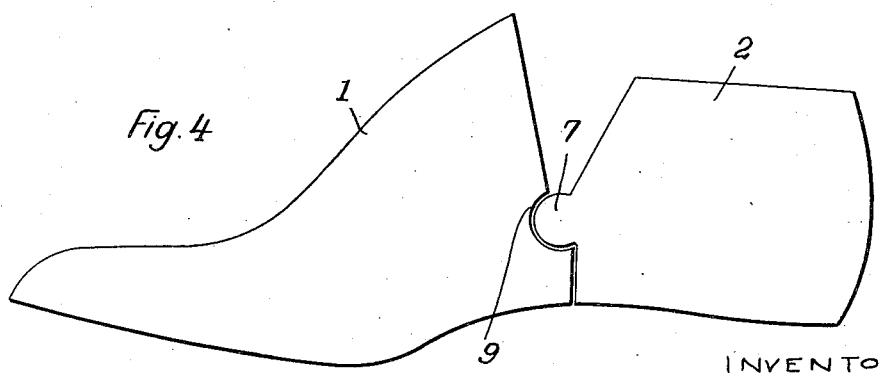
INVENTOR:
Karl Benscheidt, jr
By Otto Munk
his Atty.

INVENTOR:
Karl Benscheidt jr
By Otto Munk
his ATTY.

Patented June 8, 1937

2,083,111

UNITED STATES PATENT OFFICE 2,083,111

DOWEL FOR LASTS

Karl Benscheidt, Jr., Alfeld-on-the-Leine, Germany

Application May 18, 1936, Serial No. 80,266
In Germany June 6, 1935

2 Claims. (Cl. 12—136)

My invention relates to dowels for lasts and more particularly for hinged lasts. As a rule hinged lasts comprise two members which can occupy various angular positions relatively to one another the end positions or at least the end position at the stretched last being determined by spring attachments or the like. The hinge point of the two last members is e. g. formed by a knuckle so shaped that an elongated cylindrical projecting rib worked out from one of the two members is fitted into a corresponding recess of the other last member. The obtention of this rib and this recess is rather difficult since they must be sawed out and therefore often fail to snugly fit into each other. When however the perfect contact of the surfaces concerned is missing the accurate fitness of the last will be jeopardized.

It has also been suggested to use cylindric dowels as fulcrum pins, which dowels are inserted in cylindric bores of the two last members. These dowels are a progress on the knuckles referred to inasmuch as the bearings for the said dowels are very easy to make by a bore being effected and subsequently sawed through. These wooden dowels however have the inconvenience that they are not able to stand the high pressure exerted by the spring on the two last members, at least not for an extended time. When the dowel is compressed even quite slightly the point of the last will go down and the camber thereof will be lower. On these grounds these lasts are often objected to by the shoe manufacturers. The reason is that the dowel used so far bear with their parallel fibres against the end-grained wood of the bore within the two last members. Consequently the end-grained wood of the last, which is much harder, is pressed into the long-cut dowel and particularly into the soft summer wood thereof. This renders the surface of the dowel rather rough and the dowel is prevented from regularly sliding within the bore, for such a long-cut dowel is pressed unround by the high pressure by reason of the elasticity of the wood.

For this reason it has also been suggested to use metallic dowels instead of wooden ones. Such metallic dowels however have the disadvantage, as compared with wood dowels, that they must not project from the surface of the last when the latter is being manufactured. The metallic dowels cannot be flushed up either relatively to the surface of the last but must be made shorter so that the openings left must be filled with a suitable compound. The wooden dowels however may readily project from the surface of the last and will subsequently be exactly flushed up while the surface of the last is being machined.

It is an object of the present invention to do away with the drawbacks referred to and to this end the invention suggests to make the dowel for the hinged last from end-grained wood, so that the fibres of the wood extend across or perpendicularly to the axis of the dowel. This end-grained wood may occupy any position relatively to the wood fibres of the last. This arrangement combines the advantages of the knuckle referred to and of the ordinary wooden dowel while the inconveniences of either arrangement are absolutely avoided.

The drawings by way of example show an embodiment of the invention relating to an end-grained wood dowel, and represents in Figs. 1 and 2 a hinged last, partly in section, in order to show the spring arrangement, the fulcrum of the two last members being formed by a dowel,

Fig. 3 the spring,

Fig. 4 a hinged last in elevation with the knuckle worked out, and

Figure 6:
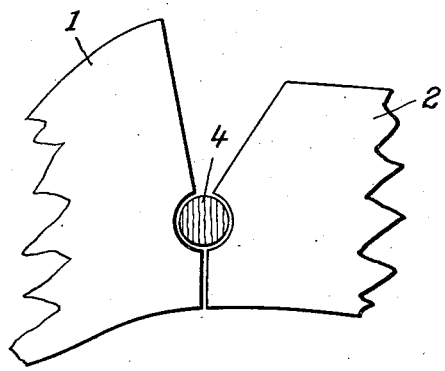
Figure 7:
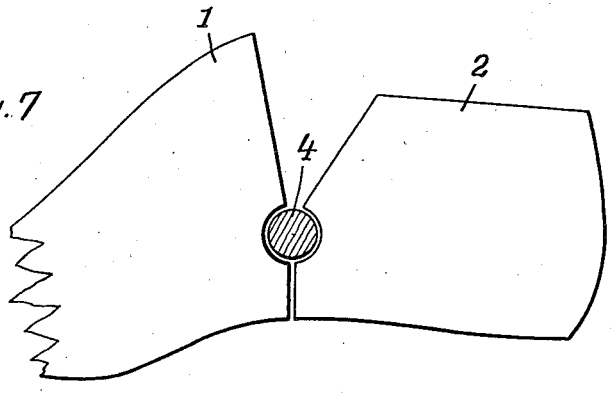

Figs. 5 to 7 the several positions of the end-grained wood dowels according to the invention in the last.

The last is manufactured in the usual manner, e. g. by being turned from wood, on the lathe, initially in one piece. In order to be converted into a hinged last it is by angular or curved cuts divided into a front member 1 and a heel member 2. When however a last of the knuckle type is made, it is sawed through, in such a way that a bead or rib 7 is formed at the heel member 2 so as to have a cylindric surface while at the same time the front member 1 is provided in the corresponding place with a cylindric recess 9. As already mentioned, this hinged knuckle type last is objectionable since it does not warrant the exact fit of the last as a whole.

When a hinged last is made with a cylindric dowel 3 according to Figs. 1 and 2, at first a hole is bored out of the solid of the last in the place intended for taking up the dowel, and with the diameter corresponding to that of the latter and subsequently there are made the angular cuts intersecting with the hole. On this dowel 3 insert the two last members 1 and 2 of the hinged last are pivotally mounted.

These two last members are connected to each other by a spring 5, which, in the embodiment shown by Figs. 1 to 3, is a corrugated leaf spring lodged in a corresponding recess of the last and at its ends pivotally mounted as at $a$ and $b$ within the last. By its tension this spring prevents the two members 1 and 2 from lateral displacement relatively to each other. The two pins $a$ and $b$ of the spring are so disposed with respect to the axis of the dowel 3 that at least in the straight line position (Fig. 1) of the last of the two last members 1 and 2 are by the spring 3 caused to bear against each other. In the collapsed position the spring usually is not stressed. When the last is brought from one position into the other position, the spring 5 is stretched.

The said spring vigorously pulls the two last members 1 and 2 together and presses the walls of the bores firmly against the body of the dowel. The body of the dowel consisting of long-cut wood, viz.: the fibres of the wood extending in the longitudinal direction of the dowel, the end-grained wood of the last members will, on account of its superior hardness, soon be pressed into the long-cut wood of the dowel and more particularly into the soft summer wood thereof, so that the last members will get shaky.

According to the present invention the dowel acting as the fulcrum pin of the last now consists of end-grained wood, that is the wood fibres thereof extend perpendicularly to the axis of the dowel. The end-grained wood of the last members 1 and 2 now bears against the end-grained wood of the dowel, and as the wood of these members substantially has the same compressive strength none of these members is subject to any ununiform wear.

In this instance it does not matter whether the fibres of the end-grained wood dowel now inserted in the last are parallel, perpendicular or in any other position relatively to the fibres of the wood of the last as shown in Figs. 5-7.

What I claim is:

1. In a shoe last, the combination of hinged sections and a separate wood dowel about which the sections pivot, said dowel having the direction of its fibres disposed transversely to the pivotal axis of the sections.

2. In a shoe last, the combination of hinged sections and a separate wood dowel about which the sections pivot, said sections being provided on their adjacent faces with semi-cylindrical grooves forming recesses for said dowel, the latter having the direction of its fibres disposed transversely to the pivotal axes of the sections.

KARL BENSCHEIDT, JR.